(12) United States Patent
Meyer et al.

(10) Patent No.: US 10,912,127 B2
(45) Date of Patent: *Feb. 2, 2021

(54) METHODS AND APPARATUSES FOR PERFORMING PREAMBLE ASSIGNMENT FOR RANDOM ACCESS IN A TELECOMMUNICATIONS SYSTEM

(71) Applicant: TELEFONAKTIEBOLAGET LM ERICSSON (PUBL), Stockholm (SE)

(72) Inventors: Michael Meyer, Aachen (DE); Magnus Stattin, Spånga (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/666,487

(22) Filed: Oct. 29, 2019

(65) Prior Publication Data

US 2020/0068622 A1 Feb. 27, 2020

Related U.S. Application Data

(63) Continuation of application No. 16/190,425, filed on Nov. 14, 2018, now Pat. No. 10,499,438, which is a
(Continued)

(51) Int. Cl.
*H04W 4/00* (2018.01)
*H04W 74/08* (2009.01)
(Continued)

(52) U.S. Cl.
CPC ... *H04W 74/0833* (2013.01); *H04W 72/0446* (2013.01); *H04W 72/1289* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | |
|---|---|---|
| 7,061,890 B2 | 6/2006 | Kim et al. |
| 7,301,921 B2 | 11/2007 | Heo |

(Continued)

FOREIGN PATENT DOCUMENTS

| | | |
|---|---|---|
| CN | 101208977 A1 | 6/2008 |
| TW | 200721862 A | 6/2007 |

(Continued)

OTHER PUBLICATIONS

3GPP, Evolved Universal Terrestrial Radio Access (E-UTRA), Physical Channels and Modulation (Release 8), Technical Specification 36.211 V8.2.0, Mar. 2008, pp. 1-65.
(Continued)

*Primary Examiner* — Bob A Phunkulh
(74) *Attorney, Agent, or Firm* — Patent Portfolio Builders PLLC

(57) ABSTRACT

The present invention relates to methods and apparatuses (radio base station) and UE for enabling a UE to perform a random access. According to embodiments of the present invention, an identification number of a dedicated random access preamble is, in a message, transmitted together with information indicating in which channel or channels the preamble is valid for the UE. The UE can then use the received information and based on that information perform a random access.

30 Claims, 9 Drawing Sheets

401. DETERMINE AN AVAILBALE DEDICATED RANDOM ACCESS PREAMBLE

402. TRANSMIT TO UE A MESSAGE COMPRISING THE DEDICATED PREAMBLE ID AND INFORMATION INDICATING IN WHICH PRACH OCCURRENCES THE PREAMBLE IS VALID FOR UE

Related U.S. Application Data continuation of application No. 15/619,766, filed on Jun. 12, 2017, now Pat. No. 10,165,601, which is a continuation of application No. 15/185,480, filed on Jun. 17, 2016, now Pat. No. 9,706,579, which is a continuation of application No. 13/947,191, filed on Jul. 22, 2013, now Pat. No. 9,480,084, which is a continuation of application No. 13/002,314, filed as application No. PCT/SE2008/051534 on Dec. 19, 2008, now Pat. No. 8,493,917.

(60) Provisional application No. 61/077,295, filed on Jul. 1, 2008.

(51) Int. Cl.
  *H04W 72/12* (2009.01)
  *H04W 72/04* (2009.01)
  *H04W 88/02* (2009.01)
  *H04W 88/08* (2009.01)

(56) References Cited

U.S. PATENT DOCUMENTS

| | | |
|---|---|---|
| 2002/0089957 A1 | 7/2002 | Viero |
| 2004/0146019 A1 | 7/2004 | Kim et al. |
| 2007/0047513 A1 | 3/2007 | Anderson |
| 2008/0043771 A1 | 2/2008 | Cho et al. |
| 2008/0310395 A1 | 12/2008 | Kashima |
| 2009/0111445 A1 | 4/2009 | Ratasuk et al. |
| 2009/0262681 A1 | 10/2009 | Park et al. |
| 2010/0002590 A1 | 1/2010 | Park et al. |
| 2010/0067511 A1 | 3/2010 | Peters |
| 2010/0216483 A1 | 8/2010 | Tynderfeldt et al. |
| 2010/0331003 A1 | 12/2010 | Park et al. |
| 2011/0110240 A1 | 5/2011 | Bergquist et al. |

FOREIGN PATENT DOCUMENTS

| | | |
|---|---|---|
| WO | 2007024101 A1 | 3/2007 |
| WO | 2007091810 A1 | 8/2007 |
| WO | 2008024788 A2 | 2/2008 |

OTHER PUBLICATIONS

3rd Generation Partnership Project; Technical Specification Group Radio Access Network; Evolved Universal Terrestrial Radio Access (E-UTRA): Radio Resource Control (RRC); Protocol specification (Release 8); 3GPP TS 36.331 V8.1.0 (Mar. 2008).
3rd Generation Partnership Project; Technical Specification Group Radio Access Network; Evolved Universal Terrestrial Radio Access (E-UTRA) and Evolved Universal Terrestrial Radio Access Network (E-UTRAN); Overall specification (Release 8); 3GPP TS 36.300 V8.4.0 (Mar. 2008).
ASUSTeK; "Issues related to RACH Access"; 3GPP TSG-RAN WG2 #58; R2-072048; May 7-11, 2007; pp. 1-3; Kobe, Japan.
Catt; "Valid PRACH resource for dedicated preamble"; 3GPP TSG RAN WG2 #61bis; R2-081672; Mar. 31-Apr. 4, 2008; pp. 1-5; Shenzhen, China.
Ericsson; "Physical-layer parameters to be configured by RCC"; TSG-RAN WG1 #53; R1-082054; May 5-9, 2008; pp. 1-6; Kansas City, MO.
Extended European Search Report in corresponding/related European Application No. 16 159 158.1 dated Oct. 12, 2016.
First Examination Report in corresponding/related Chile Application 01504-2009 dated Jun. 29, 2011.
First Office Action in corresponding/related Chinese Application No. 200880131027.7 dated Mar. 12, 2013.
International Preliminary Report on Patentability in corresponding/related International Application No. PCT/SE2008/051534 dated Sep. 9, 2010.
International Search Report in corresponding/related International Application No. PCT/SE2008/051534 dated May 26, 2009.
Itzik Shahar et al., "Coordinated association during scanning", IEEE 802.16 Broadband Wireless Access Working Group, May 4, 2005, pp. 1-21.
NEC et al., Signalling on DL Data Arrival, 3GPP Tdoc R2-080833, Feb. 11, 2008, pp. 1-5, TSG RAN WG2 Meeting #61, Sorrento, IT.
Office Action and Search Report in corresponding/related ROC (Taiwan) Patent Application No. 098119979, dated Mar. 10, 2014.
Office Action in corresponding/related Chinese Application No. 201410186241.X dated Dec. 19, 2016.
Written Opinion in corresponding/related International Application No. PCT/SE2008/051534 dated May 26, 2009.
Nokia, Nokia Siemens Networks; Proposed response to RAN 2 LS on signaling for DL data arrival (R2-074575); 3GPP TSG RAN WG1 #51 Meeting; R1-074857; Nov. 5-9, 2007; 2 pages; Jeju, Korea.
Extended European Search Report in corresponding/related European Application No. EP 20 15 9372 dated Jul. 22, 2020. (All references not cited herewith have been previously made of record.).

METHODS AND APPARATUSES FOR PERFORMING PREAMBLE ASSIGNMENT FOR RANDOM ACCESS IN A TELECOMMUNICATIONS SYSTEM

CROSS REFERENCE TO RELATED APPLICATIONS

This application is a continuation of U.S. patent application Ser. No. 16/190,425, filed Nov. 14, 2018, which is a continuation of U.S. patent application Ser. No. 15/619,766, filed Jun. 12, 2017, which is a continuation of U.S. patent application Ser. No. 15/185,480, filed Jun. 17, 2016, which is a continuation of U.S. patent application Ser. No. 13/947,191, filed Jul. 22, 2013, which is a continuation of U.S. patent application Ser. No. 13/002,314, filed Dec. 31, 2010, which is a National Stage of PCT Application No. PCT/SE2008/051534, filed Dec. 19, 2008, which is related to, and claims priority from, U.S. Provisional Patent Application Ser. No. 61/077,295 filed Jul. 1, 2008, the disclosure of which is incorporated here by reference.

TECHNICAL FIELD

The present invention relates generally to the field of wireless telecommunications, and, more particularly, to methods and apparatuses for assignment of a preamble to a user equipment for enabling the user equipment to perform a random access in a telecommunications system.

BACKGROUND

The 3rd Generation Partnership Project (3GPP) is responsible for the standardization of the UMTS (Universal Mobile Telecommunication Service) system, and LTE (Long term Evolution) is now under discussion as a next generation mobile communication system of the UMTS system. LTE is a technology for realizing high-speed packet-based communication that can reach data rates of more than 100 Mbps on the downlink and of more than 50 Mbps on the uplink. The 3GPP work on LTE is also referred to as Evolved Universal Terrestrial Access Network (E-UTRAN).

Generally, one or more cells are allocated to a radio base station, known in the 3GPP LTE system as eNB (enhanced/evolved NodeB) or eNodeB. In addition, eNBs in LTE will interact directly with the core network and with other eNBs. A plurality of user equipments can be placed in a cell served by an eNB. A user equipment (UE) can be represented by a mobile phone, a wireless terminal, a laptop, a personal computer, a personal digital assistant, a voice over internet protocol (VoIP) capable phone or any other 3GPP LTE capable UE. Generally, a UE's first access to the system is performed by means of a random access (RA) procedure. The objectives of the RA procedure may include: initial access; handover; scheduling request (request for radio resources); timing synchronization, and the like. The radio network nodes generally control the behavior of the UE. As an example, uplink transmission parameters like frequency, timing and power are regulated via downlink control signalling from the radio base station (e.g. eNB) to the UE. For the uplink (UL) frequency and power estimate parameters, a UE can derive those parameters from one or several downlink (control) signals. However, making a timing estimate for the uplink is more difficult due to that the propagation delay between the eNB (or eNodeB) and the UE is generally unknown. As an example, when a UE is powered on or turned on or after a long standby time, the UE is not synchronized in the uplink. Therefore, before commencing traffic, the UE has to access the network, which in a first step includes obtaining synchronization to the network. This is usually done by the UE which performs measurement(s) by listening to downlink signals and obtain from these signals timing synchronization; an estimate of a frequency error, and also an estimate of the downlink pathloss. Even though the UE is now time-synchronized to the downlink, signals to be sent from the UE are still not aligned with the reception timing at the eNB (or eNodeB) due to said unknown propagation delay. Thus the UE has to carry out a random access (RA) procedure to the network. The RA procedure is a procedure typically used by the UE to request access to a system or resources when the UE discovers a need to acquire uplink synchronization or a need to make an uplink transmission and no resources for said uplink transmissions are yet available to the UE. Furthermore, synchronization or time alignment of uplink transmissions aims to minimize interference with transmissions of other UEs and increase resource efficiency by minimizing the need for guard bands.

The RA procedure can be classified into a contention-based random access procedure and a contention-free (or non-contention-based) random access procedure.

For the contention-based random access procedure, a first set forming a pool of non-dedicated random access preambles is assigned per cell (i.e. to a eNodeB). This pool is primarily used when there is UE-originated data and the UE has to establish a connection and an adequate uplink timing relation with the network through the RA procedure. When performing contention-based random access, the UE arbitrarily selects a preamble from the pool as the non-dedicated random access preamble. This is known as UE initiated random access (supported in LTE). Thus for contention-based random access, the network (or the eNB) is not (immediately) aware of which UE selected which preamble. A drawback with this is that multiple UEs may in fact select the same preamble and they may attempt to access the network (or eNodeB) at the same time. This may cause collision(s) to occur. Thus, an extra step of identifying UEs trying to access the network (or eNodeB) and resolving potential collisions, a so-called contention resolution mechanism, is needed.

For performing contention-free random access, there is also defined a second set forming a pool of random access preambles assigned per cell (i.e. to a eNodeB). These preambles are known as dedicated random access preambles. Contrary to the non-dedicated random access preambles, a dedicated random access preamble is assigned to the UE by the eNodeB. In other words, this preamble cannot be autonomously selected by the UE and therefore, for the duration of the validity of the assignment, this dedicated random access preamble is exclusively dedicated to the UE. This is known as network triggered or network ordered random access (supported in LTE). Since a specific preamble is assigned/dedicated to the UE, it is a benefit of contention-free access that the eNodeB can immediately know from the received preamble, which UE tries (or tried) to access the network. This thus eliminates the need for contention resolution and therefore improves resource efficiency by minimizing the risk of collisions. Furthermore, avoiding the contention resolution procedure reduces the delay.

It should be noted that the network-triggered (e.g. in the E-UTRAN) random access can be used to force a UE, which does not have a valid uplink timing to synchronize its uplink to the timing at the eNodeB, e.g., prior to the eNodeB making a downlink transmission for which the UE will need to transmit an acknowledgment (ACK) or a negative-acknowledgment (or a non-acknowledgment) (NACK) feedback. It should also be mentioned that because of the non-zero duration of the random access and uplink synchronization procedure, the re-synchronization is typically forced in advance of making the downlink transmission. In general a UE (e.g. a mobile terminal) looses synchronization if it is not active for a certain time. It is thus possible to define a decision criterion in the network (e.g. in the E-UTRAN) that after a certain time without any activity a UE (e.g. a mobile terminal) is assumed to have lost synchronization to the eNB.

If e.g. downlink data arrives at the UE, synchronization needs to be re-established first, and for this purpose, the above described dedicated random access preamble is assigned to the UE, which the UE can use to perform a contention-free random access procedure. This will trigger a timing advance adjustment command from the eNB, and based on this command, the UE can re-establish time-alignment. For instance, in LTE (or E-UTRAN) the physical downlink control channel PDCCH is used to assign a dedicated preamble.

Since the random access procedure is the first procedure performed by the UE to access the network, it is important that random access works as it should. If random access fails, the UE cannot access the network. An exemplary scenario where a random access procedure can fail or cannot be performed is when all of the dedicated preambles are already in use. As mentioned before, the eNodeB keeps track of the dedicated preambles it has already allocated/assigned, and when there is no such dedicated preamble available for allocation, the eNB has to advice/refer other UEs, for which there is no dedicated random preamble, to perform a contention-based random access. However, as mentioned before, contention-based random access leads to potential collisions and additional delays when a contention resolution needs to be performed. If collisions occur and one or more UEs fail with their random access, one or several UEs may retry the random access procedure after a certain time which leads to that a back-off mechanism may be triggered that introduces further delays. A back-off mechanism is an approach to control UE re-accesses attempts by introducing e.g. a back-off parameter that represents a period of time to wait before an access reattempt.

Thus, the larger the number of re-access attempts, the longer the delay.

SUMMARY

It is therefore an object of the exemplary embodiments of the present invention to address the above mentioned problems and to provide methods and apparatuses for enabling one or more UEs to perform a successful random access by allowing the use of one or more dedicated random access preamble(s) for one or more UEs by introducing a validity pattern representing in which channel occurrence(s) the dedicated preamble(s) is valid to be used by UE(s) for random access. This will lead to a reduction in random access delays and also a reduction in the number of collisions that may occur.

According to a first aspect of embodiments of the present invention, the above stated problem is solved by means of a method in a radio base station of assigning a preamble to a UE. The radio base station representing a eNB or a eNodeB or a NodeB, is allocated a first set forming a pool of non-dedicated random access preambles and a second set forming a pool of dedicated random access preambles.

According to embodiments of the present invention, the radio base station determines an available dedicated random access preamble from the second set; it then transmits a message to the UE, the message comprising an identification number of the available dedicated preamble and further comprising information indicating in which of one or more PRACH (physical random access channel) occurrences, the dedicated preamble is valid to be used by the UE for random access.

Thus, in order to, for example, to alleviate the case where there is shortage of dedicated random access preambles and in order to extent the availability of dedicated random access preambles, the radio base station is configured to determine the availability of a dedicated random access preamble for assignment to the UE and to transmit in a message, the identification number of the dedicated preamble and further indicating in said message a validity pattern for enabling the UE to know in which PRACH occurrence(s) the dedicated preamble is valid for the UE.

According to a second aspect of embodiments of the present invention, the above stated problem is solved by means of a method in a UE to enabling said UE to perform a random access in a telecommunications system comprising a radio base station to which, as mentioned above, is allocated a first set forming a pool of non-dedicated random access preambles and a second set forming a pool of dedicated random access preambles. The method according to embodiments of the present invention comprises the steps of: receiving a message from the radio base station, the message comprising an identification number of an available dedicated access preamble of the second set. The message further comprising information indicating in which of one or more PRACH occurrences the dedicated random access preamble is valid to be used by the UE for random access. The method further comprises: performing a random access based on the received identification number of the available dedicated preamble and based on the indicated information concerning said one or more PRACH occurrences.

According to a third aspect of embodiments of the present invention, the above stated problem is solved by means of a radio base station for assigning a preamble to a UE for enabling the UE to perform random access. As mentioned above, a first set forming a pool of non-dedicated random access preambles and a second set forming a pool of dedicated random access preambles are assigned to the radio base station. The radio base station, according to embodiments of the present invention is configured to determine a dedicated random access preamble from the second set; to transmit a message to the UE, the message comprising an identification number of the determined dedicated preamble and comprising information indicating in which of one or more PRACH (physical random access channel) occurrences, the dedicated preamble is valid to be used by the UE for random access.

According to a fourth aspect of embodiments of the present invention, the above stated problem is solved by means of a UE for performing a random access in a telecommunications system comprising a radio base station to which, as mentioned above, is allocated a first set forming a pool of non-dedicated random access preambles and a second set forming a pool of dedicated random access preambles. The UE, according to embodiments of the present invention is configured to: receive a message from the radio base station, the message comprising an identification number of an available dedicated access preamble of the second set. The message further comprising information indicating in which of one or more PRACH occurrences the dedicated random access preamble is valid to be used by the UE for random access. The UE is further configured to perform a random access based on the received identification number of the available dedicated preamble and based on the indicated information concerning said one or more PRACH occurrences.

According to a fifth aspect of embodiments of the present invention, the above stated problem is solved by means of a method in a telecommunications system, of assigning a preamble to a UE, for enabling the UE to perform a random access. The system comprises a radio base station that is allocated a first set forming a pool of non-dedicated random access preambles and a second set forming a pool of dedicated random access preambles. According to embodiments of the present invention, the method comprises the steps of: determining in the radio base station, a dedicated random access preamble, of the second set, available for assignment to the UE; receiving at the UE, a message from the radio base station, the message comprises an identification number of the available dedicated random access preamble and further comprises information indicating in which of one or more PRACH occurrences the dedicated random access preamble is valid to be used by the UE for random access; and performing, by the UE, a random access based on the received identification number of the available random access preamble and based on the indicated information concerning the one or more PRACH occurrences.

According to a sixth aspect of embodiments of the present invention, the above stated problem is solved by means of a telecommunications system for assigning a preamble to a UE, for enabling the UE to perform a random access. The system comprises a radio base station that is allocated a first set forming a pool of non-dedicated random access preambles and a second set forming a pool of dedicated random access preambles. In the system, in accordance with embodiments of the present invention, the radio base station is configured to determine a dedicated random access preamble, of the second set, available for assignment to the UE; the UE is configured to receive a message from the radio base station, the message comprises an identification number of the available dedicated random access preamble and further comprises information indicating in which of one or more PRACH occurrences the dedicated random access preamble is valid to be used by the UE for random access; and the UE is further configured to perform a random access based on the received identification number of the available random access preamble and based on the indicated information concerning the one or more PRACH occurrences.

An advantage with the present invention is that the random access delay is reduced.

Another advantage with the present invention is that it allows to virtually extend dedicated preambles by introducing a validity pattern in the time domain such that to alleviate the case where there is shortage of dedicated preambles.

A further advantage with the present invention is that, for a given load for contention-free random access, the size of the set forming a pool of dedicated preambles can be reduced. This in turn means that more non-dedicated random access preambles are available, which implies that the risk for collisions is minimized.

Still other objects and features of the present invention will become apparent from the following detailed description in conjunction with the accompanying drawings, attention to be called to the fact, however, that the following drawings are illustrative only, and that various modifications and changes may be made in the specific embodiments illustrated as described within the scope of the appended claims. It should further be understood that the drawings are not necessarily drawn to scale and that, unless otherwise indicated, they are merely intended to conceptually illustrate the structures and procedures described herein.

DETAILED DESCRIPTION

In the following description, for purposes of explanation and not limitation, specific details are set forth such as particular architectures, scenarios, techniques, etc. in order to provide thorough understanding of the present invention. However, it will be apparent to the person skilled in the art that the present invention and its embodiments may be practiced in other embodiments that depart from these specific details.

The different embodiments of the present invention are described herein by way of reference to particular example scenarios. In particular, the invention is described in a non-limiting general context in relation to random access procedures in a telecommunications network system that is based on the third generation (3G) long term evolution (LTE) concept. It should be noted that the present invention is not restricted to 3G LTE but can be applicable in other wireless systems that employ random access procedures, such as WiMAX (worldwide interoperability for microwave access), or HSPA (high speed packet access) or HSUPA (high speed uplink packet access) or HSDPA (high speed downlink packet access) or WCDMA (wideband code division multiple access) etc.

Figure 1:
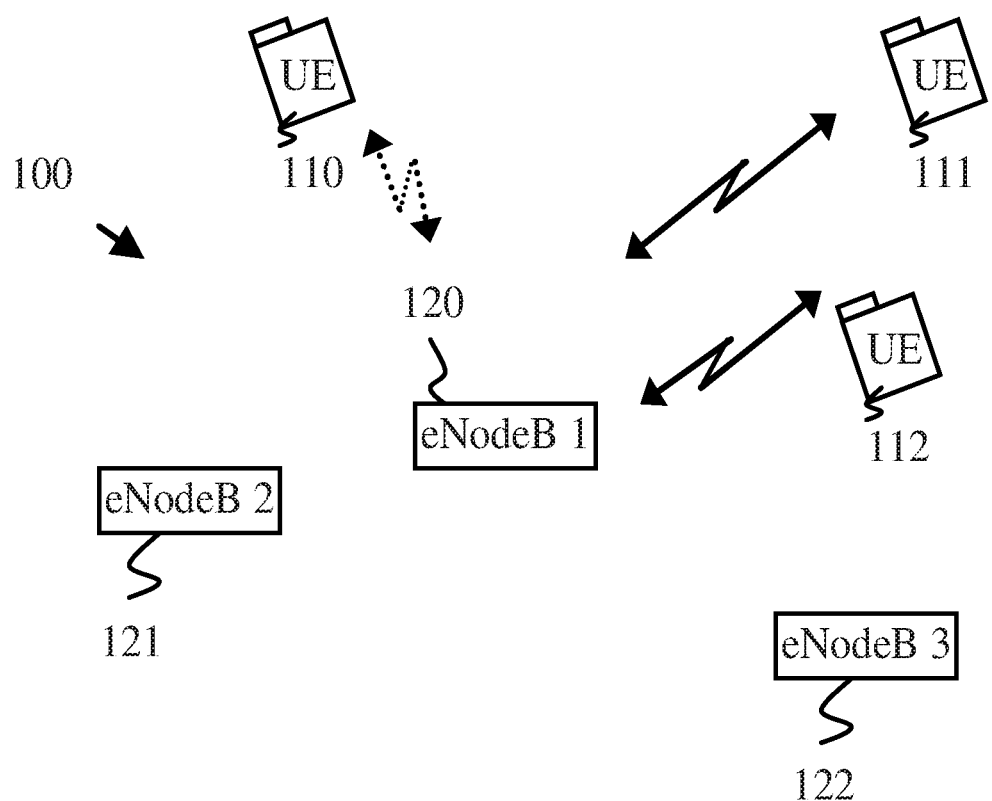
FIG. 1 is a diagram illustrating an example of a wireless network telecommunications system wherein exemplary embodiments of the present invention can be applied.

Referring to FIG. 1, there is illustrated a block diagram of an exemplary wireless telecommunications network system 100 in which the different exemplary embodiment of the present invention may be applied. Note that the system depicted in FIG. 1 only shows transceivers or nodes that are necessary for understanding the different exemplary embodiments of the present invention. As shown, the system 100 which is here considered to represent a simplified 3GPP LTE system, comprises a number of user equipments UE 110, UE 111, UE 112, and apparatuses acting as radio base stations and denoted eNodeB 1 120, eNodeB 2 121 and eNodeB 3 122. One of the functions of the eNodeBs is to control traffic to and from UEs in a cell. A UE is suitable to be used as a mobile phone, a wireless terminal, a laptop, a personal computer, a personal digital assistant, a voice over internet protocol (VoIP) capable phone or any other 3GPP LTE capable equipment. Traffic, over a radio link, from a eNodeB to a UE is referred to as downlink (DL) traffic and traffic, over a radio link, from the UE to a eNodeB is referred to as uplink (UL) traffic. Note that in FIG. 1, the number of UEs and eNodeBs is only illustrative and the embodiments of the present invention are not restricted to any particular number of UEs and/or number of eNodeBs.

Referring back to FIG. 1, it is here assumed that UE 111 and UE 113 are served by eNodeB 1 120. In other words it is assumed that UE 111 and UE 113 have already successfully random accessed the network 100 and are connected wirelessly to the eNodeB 1 120. Furthermore, it is also assumed, for easily of understanding the principles of the embodiments of the present invention, that a eNodeB e.g. eNodeB 1 120 is serving one cell alone, although this is not necessary. In LTE, there is in total a set comprised of 64 random access preambles available per cell (or configured for a cell). Thus, a eNodeB can be allocated/assigned these 64 preambles. It should be noted that preambles assigned to different cells controlled by the same eNodeB do not necessarily belong to the same set of preambles i.e. different sets (and pools) are typically cell specific. However, for better understanding the different embodiments of the present invention, it is here assumed that a eNodeB is serving a single cell and therefore, in this case, it is adequate to state that a set of 64 preambles are assigned by eNodeB (or per cell).

A first set within this set of 64 preambles, forms a pool of preambles for use with contention-based random access. The preambles of this pool are, as mentioned earlier, known as non-dedicated random access preambles. This pool is primarily used when there is UE-originated data and the UE has to establish a connection and/or an adequate uplink timing relation with the network through the random access (RA) procedure. When performing contention-based random access, the UE chooses/selects a non-dedicated random access preamble from this first set by random. For each non-dedicated random access preamble of this first set is associated a preamble identification number (or preamble identifier). Among the set of 64 preambles, there is also a second set forming a pool of dedicated random access preambles. A dedicated random access preamble of the second set is, as mentioned before, used to perform a contention-free random access. For contention-free random access, it is the eNodeB that assigns a dedicated random access preamble to the UE. In other words this type of random access is triggered by the network (e.g. the eNodeB). For each dedicated random access preamble of this second set is also associated a preamble identification number (ID) (or preamble identifier). The eNodeB keeps track of the dedicated preamble IDs that are currently in use. For contention-free random access, the eNodeB can therefore map the received preamble to the UE that has sent the dedicated random access preamble and has tried to access the system or network system. Therefore, no contention resolution procedure needs to be performed.

Referring back to FIG. 1, assume that, in respect of the UE 110, a contention-free random access procedure is triggered by the network (e.g. by the eNodeB 1 120) so that the UE can establish a time alignment and synchronization to the network (e.g. eNodeB). This is schematically illustrated using a dashed arrow between UE 110 and eNodeB 1 120. As mentioned earlier, the eNodeB 1 120 keeps track of all the dedicated random access preambles (and dedicated preamble IDs) it has allocated and that are currently in use. Once a contention-free random access has successfully completed or the validity of the dedicated preamble allocation has expired, the dedicated preamble can be re-used. However, in the event that none of the dedicated random access preambles, in the second set, is for the moment available for allocation to the UE 110, the eNodeB 1 120 has to refer UEs, for which there is no dedicated preamble, to perform a contention-based random access. However, contention-based random access generally leads to that potential collisions occur in addition to delays when a contention resolution needs to be performed.

Therefore, in order to alleviate an exemplary problem scenario that no dedicated preambles are available to perform a contention-free random access, the eNodeB 1 120 in accordance with embodiments of the present invention, is configured to determine that a dedicated random access preamble from the second set is available for assignment to the UE 110 and is further configured to transmit to the UE 110 a message, on e.g. a physical downlink control channel (PDCCH), indicating the preamble ID of the determined dedicated random access preamble and further indicating a validity pattern in e.g. the time domain specifying in which physical random access channel (PRACH) occurrence the dedicated preamble is valid to be used by the UE to conduct random access. As an example, since the eNodeB 1 120 keeps track of the dedicated preambles and associated IDs that are currently in use, it also knows when a random access based on a dedicated preamble has successfully completed or the validity of the allocation has expired and thus can determine that such a dedicated preamble is now available and can be re-used. If the eNodeB 1 120 needs to establish an uplink synchronization, it sends, in e.g. the PDCCH message, the preamble ID of this available preamble and information indicating in which PRACH occurrence the dedicated preamble is valid for the UE 110. The UE 110 then can perform a random access based on the preamble ID received from the eNodeB 1 120 and also based on the indicated information concerning the PRACH occurrence(s).

It should be noted that in the LTE technical specification 3GPP TS 36.211 entitled: "Evolved Universal Terrestrial Radio Access (E-UTRA) Physical Channels and Modulation (Release 8)", downlink and uplink transmissions are organised into radio frames wherein each radio frame has a duration of 10 ms. Two different radio frame structures are defined, one frame structure known as type 1 which is applicable to FDD (Frequency Division Duplex) and another frame structure known as type 2 applicable to TDD (Time Division Duplex). The above technical specification 3GPP TS 36.211 also defines that for FDD, 10 subframes per radio frame are available for downlink transmissions and 10 subframes (of the same radio frame) are available for uplink transmissions and that uplink and downlink transmission are separated in the frequency domain. Furthermore, a type 1 frame structure comprises 20 slots of length 0.5 ms each and that 2 consecutive slots define a subframe which is thus 1 ms long.

Figure 2:
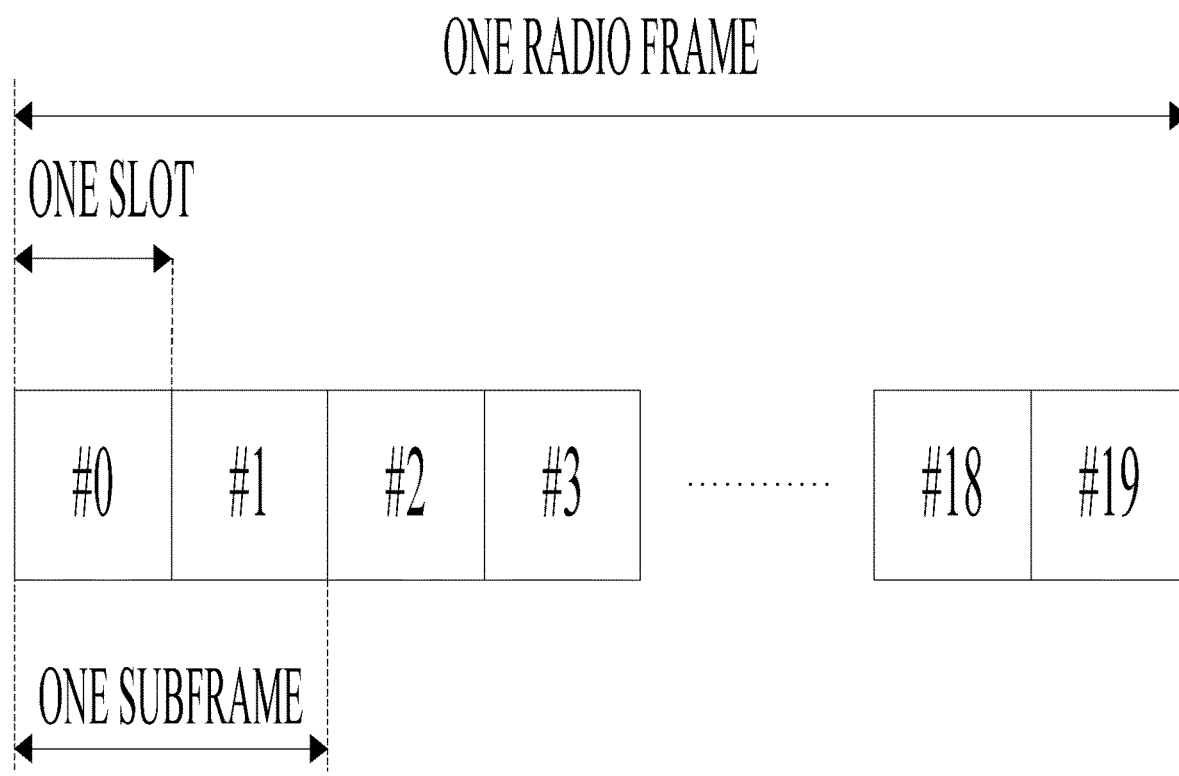
FIG. 2 is a diagram illustrating a type 1 frame structure applicable to LTE FDD according to prior art.

Referring to FIG. 2 there is illustrated a type 1 frame structure applicable to LTE FDD, as defined in 3GPP TS 36.211. The technical specification 3GPP TS 36.211 also defines that PRACH resources and their occurrence(s) are configured for each cell (or eNodeB) and are communicated on either broadcast or dedicated control channels (e.g. PDCCH). Sixteen PRACH configurations are defined for FDD in 3GPP TS 36.211.

According to an embodiment of the present invention and as mentioned earlier, the PDCCH message can convey the dedicated preamble ID determined as available by the eNodeB 1 120 and also convey the information indicating in which one or more PRACH occurrences, the dedicated preamble is valid for the UE. As an example, the information can indicate in which subframe(s) the assigned dedicated random access preamble is valid to be used by the UE. According to an embodiment of the present invention, the subframe(s) is/are tied to the frame structure e.g. the radio frame structure.

In the following, an exemplary embodiment shall be described in more detail in the context of FDD PRACH configuration 12. PRACH configuration 12 defines that PRACH resources occur in subframe #0; subframe #2, subframe #4, subframe #6 and subframe #8 of each radio frame.

Figure 3A:
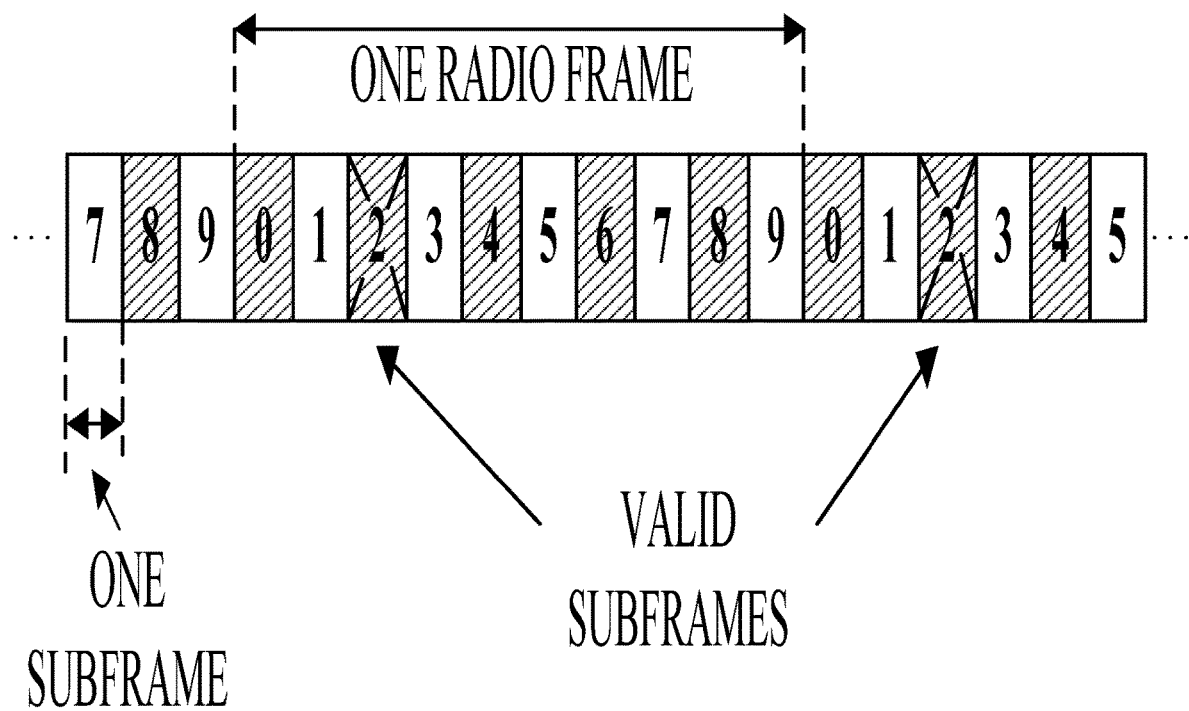
FIG. 3A is a diagram illustrating an exemplary PRACH configuration using an exemplary validity pattern applicable to exemplary embodiments of the present invention.

As an exemplary embodiment of the present invention, the information in the PDCCH message can indicate in a field of said PDCCH message, that e.g., in case of PRACH configuration 12, the available dedicated preambles is valid only in subframe #2 in each radio frame. This is illustrated in FIG. 3A where it is indicated that the dedicated preamble is valid for the particular UE in subframe 2 in each frame. It should be mentioned that for PRACH configuration 12, there are, as described above, several subframes that can be selected where the dedicated preamble is valid for the UE. Such subframes are also shown in FIG. 3A and are numbered, as above, namely, subframe #0; subframe #2, subframe #4, subframe #6 and subframe #8. However, the example described and illustrated in FIG. 3A shows that the dedicated preamble is valid only in subframe #2 in each radio frame, in accordance with the information indicated in the PDCCH message. It should be noted that it is also implied here that e.g. the same dedicated preamble can be assigned to different UEs for subframe #0, subframe #4, subframe #6, and/or subframe #8 respectively. Effectively, this means that the dedicated preamble availability is increased in this example by a factor of 5. Obviously, the usage of such a validity pattern significantly reduces the risk of running out of dedicated preambles that are available for assignment.

It should be mentioned that the exemplary embodiments of the present invention are not restricted to PRACH configuration 12. In other words all PRACH configurations defined for FDD (e.g. frame structure type 1) can be used. As an example, a conceivable configuration for PRACH resources could be that they occur in all radio frames in subframe #1 (PRACH configuration 3).

Figure 3B:
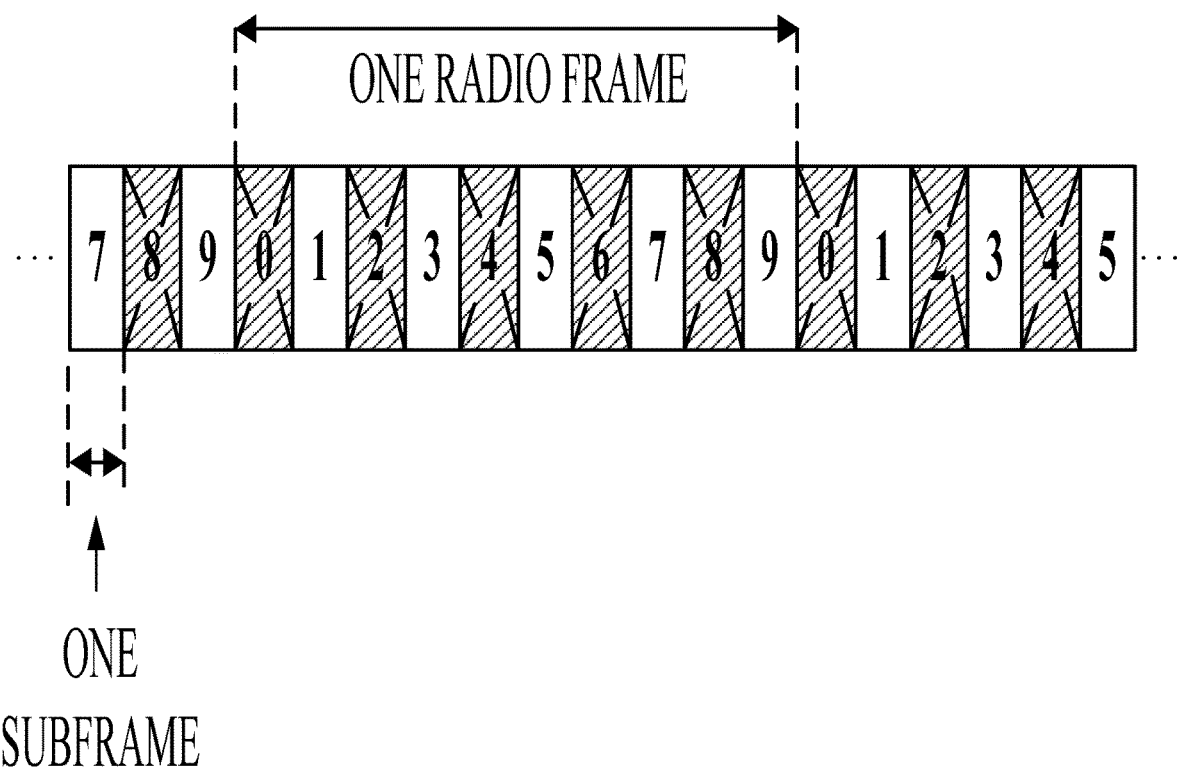
FIG. 3B is a diagram illustrating the exemplary PRACH configuration using another exemplary validity pattern applicable to exemplary embodiments of the present invention.

Another example using PRACH configuration 12, is that the PRACH resource, for the UE, occurs, in each frame, in subframe #0; subframe #2, subframe #4, subframe #6 and subframe #8. This is shown in FIG. 3B where subframe #0; subframe #2, subframe #4, subframe #6 and subframe #8 are indicated inside each frame respectively. The subframes that are not used have a white background (e.g. subframe #7, subframe #1, etc. . . . ).

As mentioned above, for PRACH configuration 12, there are several subframes for which the dedicated preamble can be valid for the UE. Such subframes are subframe #0; subframe #2, subframe #4, subframe #6 and subframe #8.

Figure 3C:
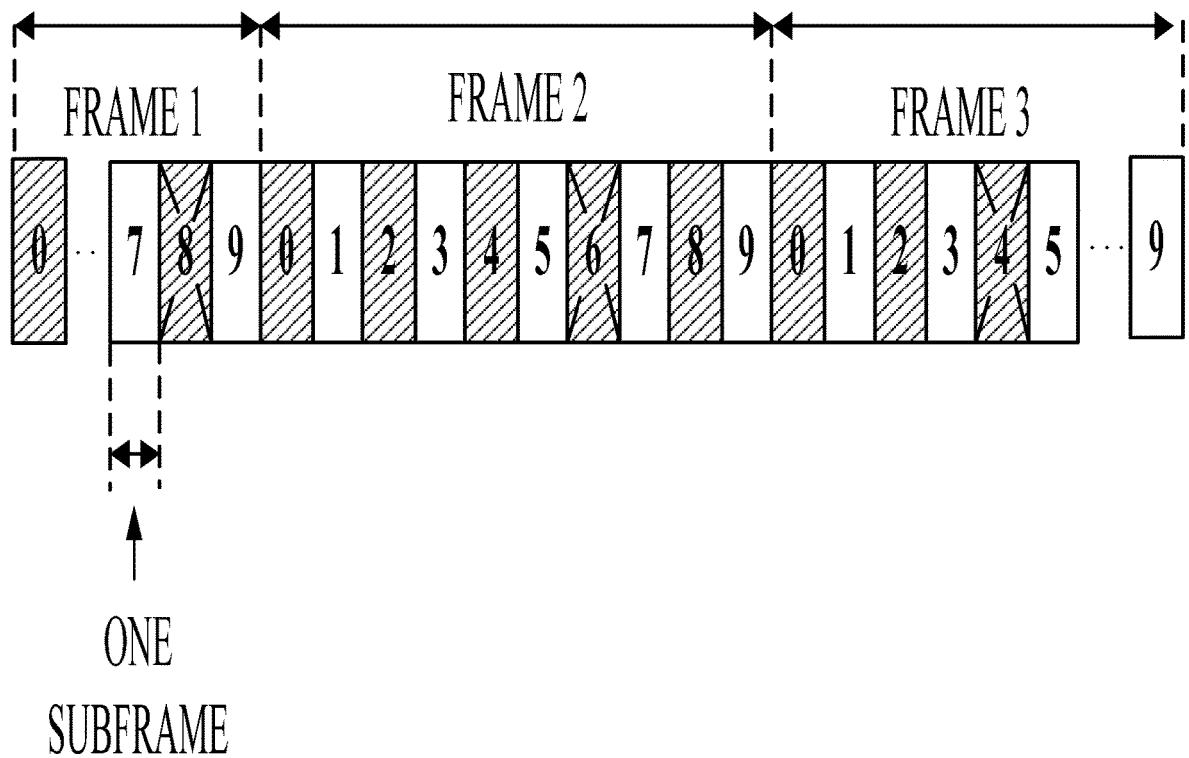
FIG. 3C is a diagram illustrating the exemplary PRACH configuration using yet another exemplary validity pattern applicable to exemplary embodiments of the present invention.

Therefore, according to another exemplary embodiment of the present invention, the field in the PDCCH message for dedicated preamble assignment can indicate the periodicity for which of the PRACH occurrence(s) the dedicated preamble is valid to be used by the UE for random access. For example, the field could indicate that for every fourth PRACH occurrence the dedicated preamble is valid for the UE. This is illustrated in FIG. 3C where it is shown that, for PRACH configuration 12, the subframe sequence (periodicity) is e.g. subframe #8 (of frame 1), subframe #6 (of frame 2), subframe #4 (of frame 3), subframe #2 (of frame 4 (not shown)) etc. . . . during which the dedicated random access preamble is valid for the UE to perform a random access. Thus, in this example a dedicated preamble is valid in every fourth PRACH occurrence. In FIG. 3C, the subframes of the sequence are shown with a cross inside.

Note that in some configurations, such as PRACH configuration 12, it is e.g. not useful for a UE to use subsequent PRACH resources since they follow each other too closely. The UE needs to wait for a response from the eNodeB (or network) before it is allowed to repeat a random access attempt. Thus, it is not useful for the UE to re-use, e.g., all of the PRACH resources of configuration 12.

The embodiments of the present invention thus increase the availability of dedicated preambles by defining a validity pattern in the time domain for the LTE FDD contention-free access. Note however that the same principle is also applicable for PRACH configurations defined for LTE TDD (i.e. frame structure type 2). Thus, the embodiments of the present invention are not restricted to LTE FDD. It should be noted that in LTE TDD a field in the PDCCH message can indicate for which PRACH resource(s) in the frequency domain and/or the time domain the dedicated preamble is valid.

According to another embodiment of the present invention, the information transmitted by the eNodeB in the message (e.g. PDCCH message) including the dedicated preamble ID, indicates/specifies a binary value indicative of one or more PRACH occurrences. This binary value is expressed by a predetermined number of bits indicated in the message (e.g. by 3 bits or 4 bits). The value can be either an explicit value or an input value to a function giving the value(s) or an index for a table or an index to a table entry or an index in a table that contains said value(s). As an exemplary embodiment of the present invention, the binary value may correspond to a PRACH index (e.g. a mask index) being associated with a predefined PRACH configuration indicating in which of one or more allowed PRACH occurrences, the dedicated preamble is valid to be used by the UE for random access. Note that by a PRACH configuration is meant e.g. a PRACH configuration indicated/defined in the previously described technical specification 3GPP 36.211. It should be noted that the PRACH index value determines the validity of the indicated dedicated preamble. As an exemplary embodiment of the present invention, the binary value may correspond to a PRACH index (e.g. a mask index). In association with the configured PRACH configuration, defined in the previously described technical specification 3GPP 36.211, the PRACH index determines the one or more subframes of a frame in which the assigned dedicated preamble is valid. For example, the FDD PRACH configuration 12 corresponds to PRACH resources in subframe #0, subframe #2, subframe #4, subframe #6 and subframe #8. The PRACH index determines for which one or more subframes of the above listed subframes the dedicated preamble is valid.

As a further example, in a case where all of the preambles in the pool of dedicated random access preambles are already allocated, the eNodeB is configured to determine when a random access based on a dedicated preamble has successfully completed or the validity of the allocation has expired, and then re-use the available dedicated preamble and transmit to the UE the preamble ID (of the available dedicated preamble) in the PDCCH message and indicate in that message a PRACH mask index. The UE then receives such a PDCCH message and performs a random access based on the preamble ID and based on the PRACH mask index since the PRACH mask index, as described above, is associated with a predefined configuration indicating in which allowed PRACH occurrences the preamble is valid to be used by the UE.

As an example, if the eNodeB explicitly signals in e.g. the PDCCH message, to the UE a dedicated preamble ID having a fixed ID value, and the eNodeB further indicates in the message, the PRACH index (e.g. a binary value corresponding to a PRACH index (e.g. a mask index)) that is used by the UE to point at one or more subframes in which the dedicated preamble is valid (i.e. to point to a validity pattern which describes in which PRACH occurrences the dedicated preamble is valid for use by the UE), then the UE knows, based on the dedicated preamble ID and the PRACH index, in which PRACH occurrence(s) the dedicated preamble is valid to it to perform a random access using the dedicated random access preamble.

It should be noted that the binary value (e.g. 3 bits or 4 bits) that assigns an offset, relative to a time reference, of the validity pattern of the PRACH resource could be an explicit value, input to a function giving the values or an index into a table that contains the values. Alternatively, a joint encoding of the binary value in the field that assigns the validity pattern of the PRACH resource and the binary value in the field that assigns the offset, relative to a time reference, of the validity pattern of the PRACH resource could be an explicit value, input to a function giving the values or an index into a table that contains the values.

Figure 4:
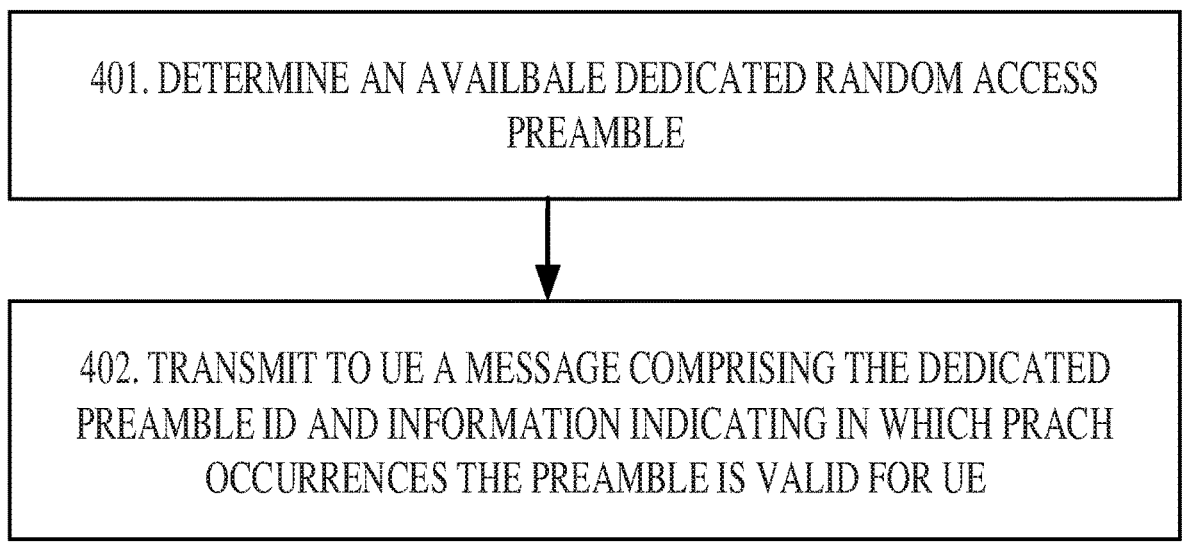
FIG. 4 is a diagram illustrating a flowchart of a method performed, in a radio base station, according to exemplary embodiments of the present invention.

Referring to FIG. 4 there is illustrated a flowchart of a method aimed to be performed/implemented in a radio base station (e.g. eNodeB), in accordance with the above described embodiments of the present invention. As mentioned earlier, the radio base station is assigned a first set forming a pool of non-dedicated random access preambles and a second set forming a pool of dedicated random access preambles. The method in the radio base station enables a UE to perform random access. The method, in the radio base station, comprises the following main steps:

(401); determining a dedicated random access preamble from the second set available for assignment to the UE;

(402) transmitting a message (e.g. on a PDCCH message or a field on the PDCCH message) to the UE, the message comprising the dedicated preamble ID of the available dedicated preamble that was determined by the radio base station, and further comprising information in which of one or more PRACH occurrences the dedicated random access preamble is valid to be used by the UE for random access.

As mentioned before, the information in the PDCCH message indicates in which subframe(s) the assigned dedicated preamble is valid to be used by the UE. The one or more subframes are tied to a frame structure, as previously described. The information may also indicate to the UE, the periodicity for which of the PRACH occurrence(s) the dedicated preamble is valid for the UE. Furthermore, the information can be indicated using a binary value, said binary value is expressed by a predefined number of bits. (i.e. 4 bits). As mentioned before, the binary value may correspond to a PRACH index that is associated with a predefined configuration indicating in which of allowed PRACH occurrence(s), the dedicated preamble is valid to be used for the UE.

Figure 5:
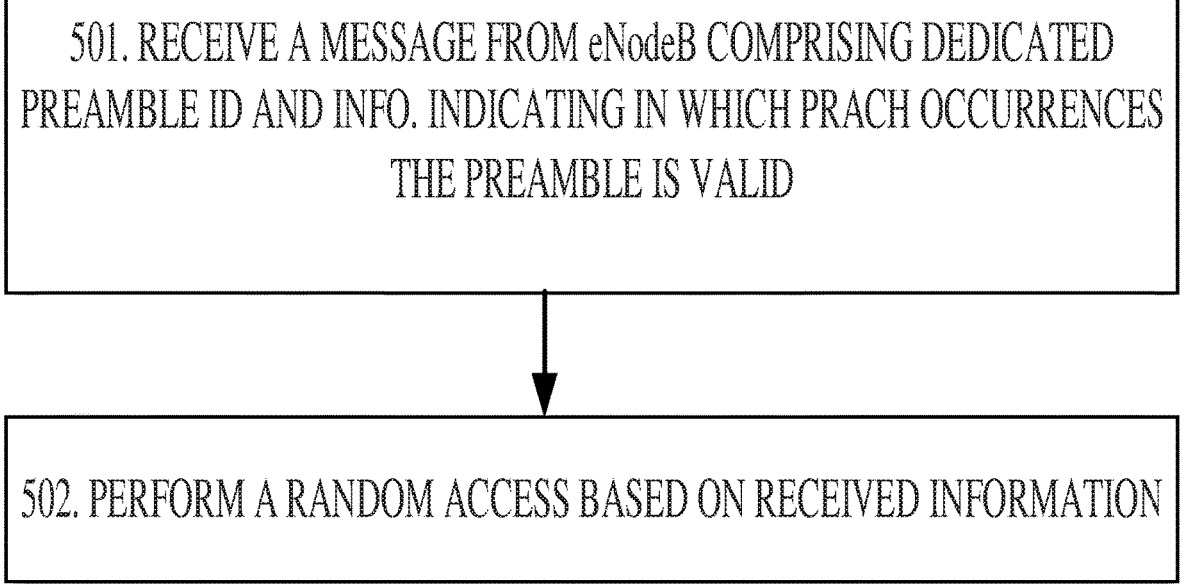
FIG. 5 is a diagram illustrating a flowchart of a method, performed in a user equipment according to exemplary embodiments of the present invention.

Referring to FIG. 5 there is illustrated a flowchart of a method aimed to be performed/implemented in a UE, in accordance with the previously described embodiments of the present invention. The method in the UE, enables said UE to perform a random access in a system wherein a radio base station is provided; said base station being assigned a first set forming a pool of non-dedicated random access preamble and a second set forming a pool of dedicated random access preambles. The method, to be performed in the UE, comprises the following main steps:

(501) receiving a message from the radio base station (or eNodeB), said message (on e.g. the PDCCH) comprises a preamble ID of an available dedicated random access preamble of the second set and further comprising information indicating in which of one or more PRACH occurrences the dedicated preamble is valid to be used by the UE for random access;

(502) performing a random access procedure based on the preamble ID of the available dedicated preamble and based on the indicated information concerning the one or more PRACH occurrences.

The different exemplary embodiments describing the subframes; the periodicity, the binary value etc. have already been described and are therefore not unnecessarily repeated again.

Figure 6:
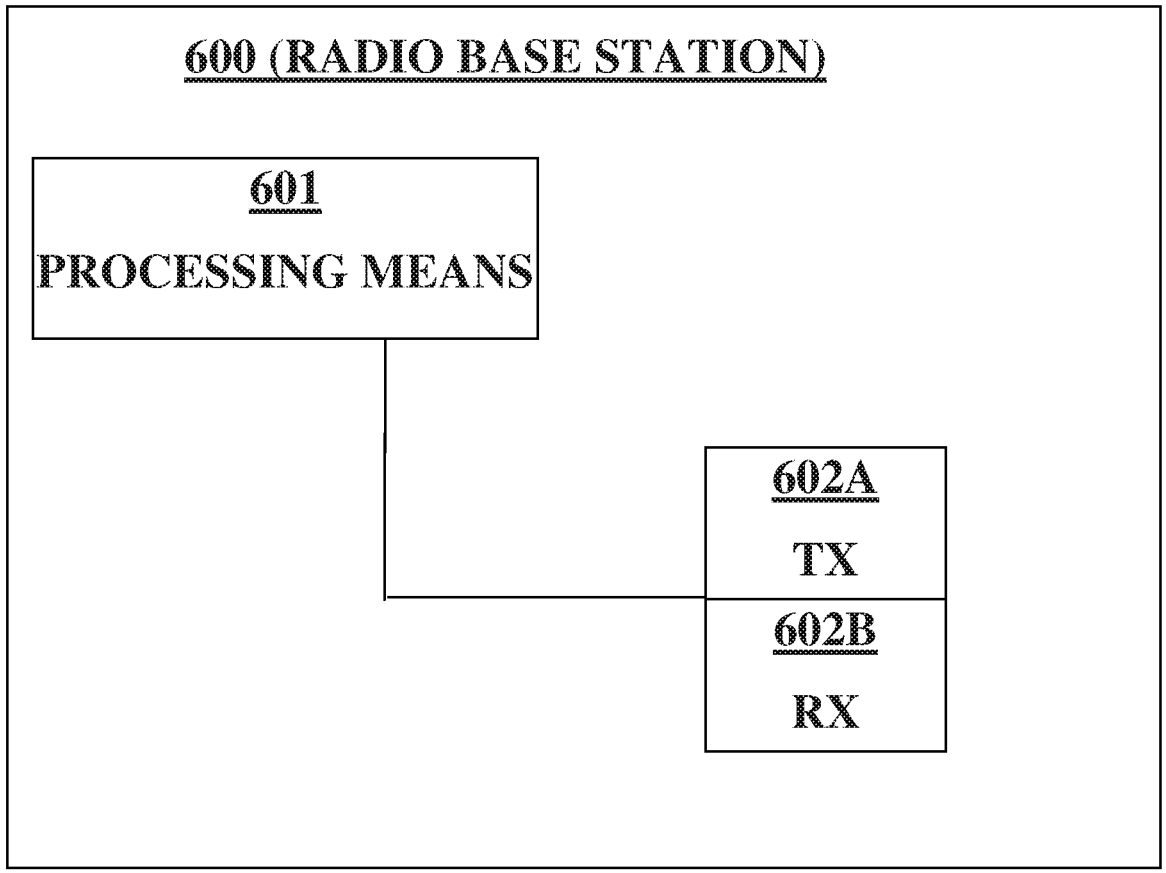
FIG. 6 illustrates a block diagram of an exemplary radio base station according to embodiments of the present invention.

Referring to FIG. 6 there is illustrated a block diagram of an exemplary radio base station 600 (e.g. eNodeB) being configured/arranged to assign to a UE a dedicated random access preamble, said radio base station being allocated a first set forming a pool of non-dedicated random access preambles and a second set forming a pool of dedicated random access preambles. As shown in FIG. 6, the radio base station 600 comprises processing means 601 adapted to determine a dedicated random access preamble, from the second set, available for assignment to the UE. As an example, once a random access based on a dedicated preamble has successfully completed or the validity of the allocation has expired, an allocated dedicated preamble can be re-used. The radio base station 600 is configured to transmit, by means of transmitting means 602A, denoted TX in FIG. 6, a message to the UE, on e.g. the PDCCH message, the dedicated and available preamble ID and further configured to indicate in that message information indicating in which of one or more PRACH occurrences the dedicated preamble is valid to be used by the UE for random access. As shown in FIG. 6, the radio base station 600 further comprises receiving means 602B, denoted RX in FIG. 6, which is arranged/configured to receive from the UE the assigned dedicated preamble that the UE used/uses to perform random access based on the dedicated preamble ID and also based on the indicated information concerning the one or more PRACH occurrences. Additional actions performed by the radio base station have already been described and are therefore not repeated. It should however be mentioned that the different exemplary blocks shown in FIG. 6 are not necessarily separated. Furthermore the TX means 602A and the RX means 602B are not necessarily included in the same block i.e. they each can be represented by a single block. The radio base station 600 is therefore not restricted and is not limited to the exemplary block diagrams shown in FIG. 6. In addition, the radio base station 600 may also comprise other element and/or blocks not illustrated in FIG. 6.

Figure 7:
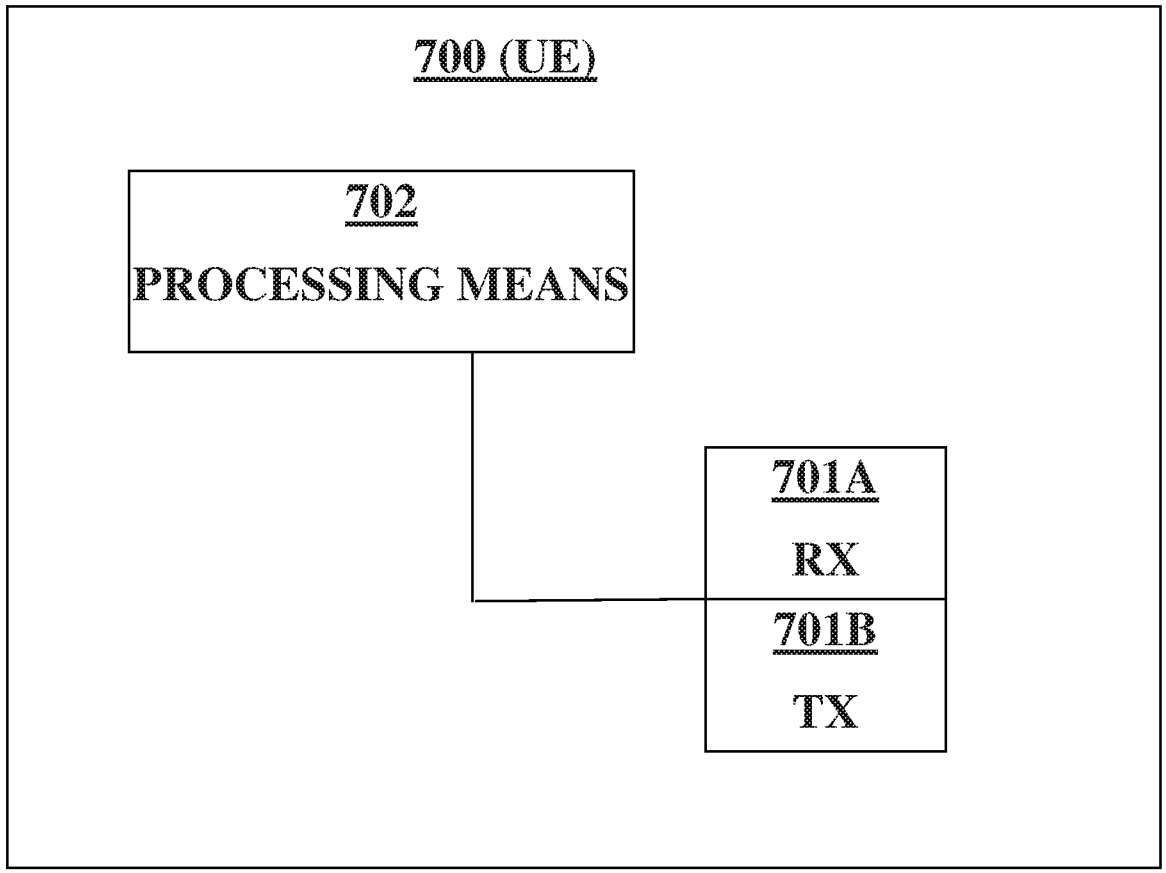
FIG. 7 illustrates a block diagram of an exemplary user equipment according to embodiments of the present invention.

Referring to FIG. 7 there is illustrated a block diagram of an exemplary user equipment (UE) 700 capable in performing a random access using an assigned dedicated random access preamble, in accordance with previously described embodiments of the present invention. As shown in FIG. 7, the UE 700 comprises receiving means 701A, denoted RX in FIG. 7, which is adapted/configured to receive from a radio base station a message comprising a dedicated preamble ID and further comprising information indicating in which of at least one PRACH occurrence the dedicated preamble is valid to be used by the UE. As a non-limiting example, the message is received on a PDCCH. The UE 700 further comprises transmitting means 701B, denoted TX in FIG. 7, which is adapted/configured to transmit, based on the received dedicated preamble ID and on the indicated information concerning the one or more PRACH occurrence, the dedicated random access preamble in order to perform a random access. The UE 700 also further comprises processing means 702 to e.g. process one or more received/transmitted messages. Again, the different exemplary embodiments describing the subframes; the periodicity, the binary value (e.g. 4 bits), etc. have already been described and are therefore not unnecessarily repeated.

As described above, several advantages are achieved by the different embodiments of the present invention. As an example, the random access delay is reduced even in cases where all of the preambles in the pool of dedicated random access preambles are already in use. Another advantage with the different exemplary of the present invention is that it allows to virtually extend dedicated preambles by introducing, as mentioned earlier, a validity pattern in the time domain such that to alleviate the case where there is shortage of dedicated preambles. Yet another advantage with the present invention is that for each random access that does not need to be referred to the usage of non-dedicated random access preambles, random access delays can be reduced.

The present invention and its embodiments can be realized in many ways. For example, one embodiment of the present invention includes a computer-readable medium having instructions stored thereon that are executable by a radio base station (e.g. eNodeB or eNB) and/or a UE of a telecommunications system. The instructions executable by the radio base station and/or the UE and stored on a computer-readable medium perform the method steps of the present invention as set forth in the claims.

While the invention has been described in terms of several preferred embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the present invention.

The invention claimed is:

1. A method in a radio base station, of assigning a preamble to a user equipment (UE), the method comprising:
   determining, from a set of dedicated random access preambles, a random access preamble, to assign to said UE; and
   transmitting a message to the UE, the message comprising an identification number of said determined random access preamble and further comprising information indicating at least one physical random access channel (PRACH) occurrence during which the determined random access preamble is valid to be used by the UE for random access,
   wherein said information indicating at least one PRACH occurrence comprises a field with a binary value indicative of said at least one PRACH occurrence, and
   wherein said binary value corresponds to a PRACH index, said PRACH index being associated with a predefined configuration indicating a plurality of PRACH occurrences during which the determined random access preamble is valid to be used by the UE for random access.

2. The method according to claim 1, wherein the predefined configuration indicates a pattern of PRACH occurrences.

3. The method according to claim 1, wherein said information indicating at least one PRACH occurrence indicates at least one subframe during which the determined random access preamble is valid to be used by the UE for random access, said at least one subframe being tied to a frame structure.

4. The method according to claim 1, wherein said information indicating at least one PRACH occurrence indicates a periodicity for said at least one PRACH occurrence during which the determined random access preamble is valid to be used by the UE for random access.

5. The method according to claim 1, wherein said binary value is expressed by a predefined number of bits.

6. The method according to claim 1, wherein the transmitting comprises transmitting said message on a physical downlink control channel (PDCCH).

7. The method according to claim 1, wherein said message includes an offset value which is relative to a time reference and ties, to at least one subframe, the information indicating at least one PRACH occurrence during which the determined random access preamble is valid to be used by the UE for random access.

8. A method of enabling a user equipment (UE) to perform a random access in a telecommunications system, the method comprising:
   receiving a message from a radio base station, the message comprising an identification number of a dedicated random access preamble assigned to the UE; said message further comprising information indicating at least one physical random access channel (PRACH) occurrence during which the assigned random access preamble is valid to be used by the UE for random access; and
   performing a random access based on the received identification number and based on the information indicating said at least one PRACH occurrence,
   wherein said information indicating at least one PRACH occurrence comprises a field with a binary value indicative of said at least one PRACH occurrence, and
   wherein said binary value corresponds to a PRACH index, said PRACH index being associated with a predefined configuration indicating a plurality of PRACH occurrences during which the assigned random access preamble is valid to be used by the UE for random access.

9. The method according to claim 8, wherein the predefined configuration indicates a pattern of PRACH occurrences.

10. The method according to claim 8, wherein said information indicating at least one PRACH occurrence indicates at least one subframe during which the assigned random access preamble is valid to be used by the UE for random access, said at least one subframe being tied to a frame structure.

11. The method according to claim 8, wherein said information indicating at least one PRACH occurrence indicates a periodicity for said at least one PRACH occurrence during which the assigned access preamble is valid to be used by the UE for random access.

12. The method according to claim 8, wherein said binary value is expressed by a predefined number of bits.

13. The method according to claim 8, wherein the receiving comprises receiving said message on a physical downlink control channel (PDCCH).

14. The method according to claim 8, wherein the receiving further comprises receiving in said message an offset value which is relative to a time reference and ties, to at least one subframe, the information indicating at least one PRACH occurrence during which the assigned random access preamble is valid to be used by the UE for random access.

15. A method in a telecommunications system, of assigning a preamble to a user equipment (UE) for enabling said UE to perform a random access, said system comprising a radio base station being allocated a set forming a pool of dedicated random access preambles, the method comprising:
  determining in the radio base station, a dedicated random access preamble, of the set, to assign to the UE;
  receiving at the UE, a message from the radio base station, the message comprising an identification number of the assigned random access preamble and further comprising information indicating in which of at least one physical random access channel (PRACH) occurrence, the assigned random access preamble is valid to be used by the UE for random access; and
  performing, by the UE, a random access based on the received identification number of the available random access preamble and based on the indicated information concerning said at least one PRACH occurrence,
  wherein said information indicating at least one PRACH occurrence comprises a field with a binary value indicative of said at least one PRACH occurrence, and
  wherein said binary value corresponds to a PRACH index, said PRACH index being associated with a predefined configuration indicating a plurality of PRACH occurrences during which the assigned random access preamble is valid to be used by the UE for random access.

16. A radio base station to assign a preamble to a user equipment (UE), the radio base station comprising:
  a memory configured to store instructions; and
  a processor configured to execute said instructions and thereby cause the radio base station:
    to determine, from a set of dedicated ransom access preambles, a random access preamble, to assign to said UE; and
    to transmit a message to the UE, the message comprising an identification number of said determined random access preamble and further comprising information indicating at least one physical random access channel (PRACH) occurrence during which the determined random access preamble is valid to be used by the UE for random access,
    wherein said information indicating at least one PRACH occurrence comprises a field with a binary value indicative of said at least one PRACH occurrence, and
    wherein said binary value corresponds to a PRACH index, the PRACH index being associated with a predefined configuration indicating a plurality of PRACH occurrences during which the determined random access preamble is valid to be used by the UE for random access.

17. The radio base station according to claim 16, wherein the predefined configuration indicates a pattern of PRACH occurrences.

18. The radio base station according to claim 16, wherein said information indicating at least one PRACH occurrence indicates at least one subframe during which the determined random access preamble is valid to be used by the UE for random access, said at least one subframe being tied to a frame structure.

19. The radio base station according to claim 16, wherein said information indicating at least one PRACH occurrence indicates a periodicity for said at least one PRACH occurrence during which the determined random access preamble is valid to be used by the UE for random access.

20. The radio base station according to claim 16, wherein said binary value is expressed by a predefined number of bits.

21. The radio base station according to claim 16, wherein said message is transmitted on a physical downlink control channel (PDCCH).

22. The radio base station according to claim 16, wherein said message indicates an offset value which is relative to a time reference and ties, to at least one subframe, the information indicating at least one PRACH occurrence during which the determined random access preamble is valid to be used by the UE for random access.

23. A user equipment (UE) capable of performing a random access in a telecommunications system, the UE comprising:
  a memory configured to store instructions; and
  a processor configured to execute the instructions causing the UE:
    to receive a message from a radio base station, the message comprising an identification number of a dedicated random access preamble assigned to the UE and further comprising information indicating at least one physical random access channel (PRACH) occurrence during which the assigned random access preamble is valid to be used by the UE for random access; and
    to perform a random access based on the received identification number and based on the information indicating said at least one PRACH occurrence,
    wherein said information indicating at least one PRACH occurrence comprises a field with a binary value indicative of said at least one PRACH occurrence, and
    wherein said binary value corresponds to a PRACH index, the PRACH index being associated with a predefined configuration indicating a plurality of PRACH occurrences during which the assigned random access preamble is valid to be used by the UE for random access.

24. The user equipment according to claim 23, wherein the predefined configuration indicates a pattern of PRACH occurrences.

25. The user equipment according to claim 23, wherein said information indicating at least one PRACH occurrence indicates at least one subframe during which the assigned random access preamble is valid to be used by the UE for random access, said at least one subframe being tied to a frame structure.

26. The user equipment according to claim 23, wherein said information indicating at least one PRACH occurrence indicates a periodicity for said at least one PRACH occurrence during which the assigned access preamble is valid to be used by the UE for random access.

27. The user equipment according to claim 23, wherein said binary value is expressed by a predefined number of bits.

28. The user equipment according to claim 23, wherein said message is received on a physical downlink control channel (PDCCH).

29. The user equipment according to claim 23, wherein said received message further indicates an offset value which is relative to a time reference and ties, to at least one subframe, the information indicating at least one PRACH occurrence during which the assigned random access preamble is valid to be used by the UE for random access.

30. A telecommunications system to enable a radio base station to assign a preamble to a user equipment (UE) for enabling the UE to perform a random access, said radio base station being allocated a set forming a pool of dedicated random access preambles, the telecommunications system comprising:

the radio base station, configured to determine a dedicated random access preamble, of the set, to assign to the UE;

the UE, configured to receive a message from said radio base station, the message comprising an identification number of the assigned random access preamble of the set and further comprising information indicating in which of at least one physical random access channel (PRACH) occurrence, the assigned random access preamble is valid to be used by the UE for random access; and the UE, configured to perform a random access based on the identification number of the available assigned dedicated random access preamble and based on the indicated information concerning said at least one PRACH occurrence, wherein said information indicating at least one PRACH occurrence comprises a field with a binary value indicative of said at least one PRACH occurrence, and wherein said binary value corresponds to a PRACH index, the PRACH index being associated with a predefined configuration indicating a plurality of PRACH occurrences during which the assigned random access preamble is valid to be used by the UE for random access.

\* \* \* \* \*

UNITED STATES PATENT AND TRADEMARK OFFICE
CERTIFICATE OF CORRECTION

PATENT NO. : 10,912,127 B2
APPLICATION NO. : 16/666487
DATED : February 2, 2021
INVENTOR(S) : Meyer et al.

It is certified that error appears in the above-identified patent and that said Letters Patent is hereby corrected as shown below:

On the Title Page

On Page 2, Item (56), under "OTHER PUBLICATIONS", in Column 2, Line 13, delete "RCC";" and insert -- RRC"; --, therefor.

In the Specification

In Column 1, Line 10, delete "2018," and insert -- 2018, now Pat. No. 10,499,438, --, therefor.

In Column 1, Line 12, delete "2017," and insert -- 2017, now Pat. No. 10,165,601, --, therefor.

In Column 1, Line 13, delete "2016," and insert -- 2016, now Pat. No. 9,706,579, --, therefor.

In Column 1, Line 15, delete "2013," and insert -- 2013, now Pat. No. 9,480,084, --, therefor.

In Column 1, Line 16, delete "2010," and insert -- 2010, now Pat. No. 8,493,917, --, therefor.

In Column 1, Lines 34-35, delete "UMTS (Universal Mobile Telecommunication Service) system," and insert -- UMTS (Universal Mobile Telecommunication System), --, therefor.

In Column 1, Lines 41-42, delete "Evolved Universal Terrestrial Access Network (E-UTRAN)." and insert -- Evolved Universal Terrestrial Radio Access Network (E-UTRAN). --, therefor.

In Column 4, Line 12, delete "extent the" and insert -- extend the --, therefor.

In Column 7, Line 20, delete "UE 113" and insert -- UE 112 --, therefor.

In Column 7, Line 21, delete "UE 113" and insert -- UE 112 --, therefor.

Signed and Sealed this
Twenty-first Day of December, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,912,127 B2

In Column 7, Line 24, delete "for easily of understanding the" and insert -- for easily understanding the --, therefor.

In Column 7, Line 50, delete "associated a" and insert -- associated with a --, therefor.

In Column 7, Line 60, delete "associated a" and insert -- associated with a --, therefor.

In Column 8, Line 46, delete "based the" and insert -- based on the --, therefor.

In Column 9, Line 21, delete "subframe #0;" and insert -- subframe #0, --, therefor.

In Column 9, Line 35, delete "subframe #0;" and insert -- subframe #0, --, therefor.

In Column 9, Line 58, delete "subframe #0;" and insert -- subframe #0, --, therefor.

In Column 9, Line 59, delete "subframe #0;" and insert -- subframe #0, --, therefor.

In Column 9, Line 66, delete "subframe #0;" and insert -- subframe #0, --, therefor.

In Column 11, Line 50, delete "(401);" and insert -- (401) --, therefor.

In Column 13, Line 29, delete "exemplary of" and insert -- exemplary embodiment of --, therefor.

In the Claims

In Column 15, Line 51, in Claim 16, delete "ransom access" and insert -- random access --, therefor.